United States Patent
Brundisini et al.

(10) Patent No.: US 9,220,205 B2
(45) Date of Patent: *Dec. 29, 2015

(54) ELECTRONIC CONTROL UNIT WITH ONE OR TWO WAYS CONTROLLED BY ELECTROVALVES FOR PROGRAMMED WATERING OF LAWNS, GARDENS, FLOWER BOXES AND SIMILAR SPACES

(71) Applicant: Claber S.p.A., Fiume Veneto (PN) (IT)

(72) Inventors: Andrea Brundisini, Pordenone (IT); Gaetano Franchini, Fiume Veneto (PN) (IT); Roberto De Biasi, Pordenone (IT)

(73) Assignee: CLABER S.P.A., Fiume Veneto (PN) (IT)

( * ) Notice: Subject to any disclaimer, the term of this patent is extended or adjusted under 35 U.S.C. 154(b) by 359 days.

This patent is subject to a terminal disclaimer.

(21) Appl. No.: 13/767,356

(22) Filed: Feb. 14, 2013

(65) Prior Publication Data

US 2013/0211604 A1 Aug. 15, 2013

(30) Foreign Application Priority Data

Feb. 15, 2012 (IT) .............................. MI2012A0218

(51) Int. Cl.
*G06F 19/00* (2011.01)
*A01G 25/16* (2006.01)

(52) U.S. Cl.
CPC .............. *A01G 25/16* (2013.01); *A01G 25/165* (2013.01)

(58) Field of Classification Search
CPC ........... G05B 2219/2625; A01G 25/16; A01G 25/165; Y10T 137/1866; Y10T 137/1842
USPC ......................................................... 700/282
See application file for complete search history.

(56) References Cited

U.S. PATENT DOCUMENTS

| | | | |
|---|---|---|---|
| 4,256,133 A * | 3/1981 | Coward et al. ............... | 137/78.3 |
| 4,797,820 A | 1/1989 | Wilson | |
| 4,858,827 A | 8/1989 | Fletcher | |
| 5,272,620 A * | 12/1993 | Mock et al. .................... | 700/16 |
| 5,602,728 A | 2/1997 | Madden | |
| 5,797,417 A * | 8/1998 | DeLattre et al. ............. | 137/78.3 |
| 5,894,276 A | 4/1999 | Altidor et al. | |
| 6,522,893 B1 | 2/2003 | Han et al. | |
| 6,647,319 B1 | 11/2003 | Goldberg | |
| 7,561,977 B2 * | 7/2009 | Horst et al. ..................... | 702/62 |
| 7,877,168 B1 * | 1/2011 | Porter et al. .................. | 700/284 |
| 8,369,998 B2 * | 2/2013 | Drake et al. .................. | 700/295 |
| 2005/0171646 A1 * | 8/2005 | Miller ........................... | 700/284 |

(Continued)

FOREIGN PATENT DOCUMENTS

EP 0 748 584 12/1996

*Primary Examiner* — Michael D Masinick
(74) *Attorney, Agent, or Firm* — Jacobson Holman, PLLC.

(57) ABSTRACT

An electronic control unit for programmed watering of lawns, gardens, flower boxes and similar spaces, comprises a front panel, a display, watering program selection push-buttons for selecting the watering duration and the watering repetition frequency and at least one start push-button for starting the selected program. The control unit comprises an electronic micro controller which, in response to the operation of said selection push-buttons, controls the visualization of the duration and frequency of the selected program and, in response to a single operation of the start push-button, controls the immediate start of the selected watering program. If the start push-button is operated for a variable number of times, the micro controller programs the delayed start of the selected program.

7 Claims, 4 Drawing Sheets

(56) References Cited

U.S. PATENT DOCUMENTS

| | | |
|---|---|---|
| 2006/0293797 A1 | 12/2006 | Weiler |
| 2009/0271044 A1* | 10/2009 | Bangalore .................... 700/284 |
| 2010/0187219 A1* | 7/2010 | Besore et al. ................. 219/494 |
| 2013/0211603 A1* | 8/2013 | Brundisini et al. ........... 700/284 |

* cited by examiner

ELECTRONIC CONTROL UNIT WITH ONE OR TWO WAYS CONTROLLED BY ELECTROVALVES FOR PROGRAMMED WATERING OF LAWNS, GARDENS, FLOWER BOXES AND SIMILAR SPACES

The present invention relates to an electronic control unit with one or two ways, i.e. with one inlet and one or two outlets, controlled by electrovalves for programmed watering of lawns, gardens and similar spaces.

Electronic control units for watering of lawns, gardens, flower boxes and similar spaces are known, which have an inlet and an outlet of water, and an electrovalve interposed for opening and closing the communication between inlet and outlet. The opening and closing times of the electrovalve are determined by an internal electronic micro controller according to selectable programs which differ from one another by duration and frequency.

An example of control unit of this type is described in EP 0 748 584 A1 and comprises a rotary switch which can be positioned by the user in a plurality of different angular positions, each corresponding to the selection of a respective watering program with duration and repetition frequency prefixed by the manufacturer.

In the above control unit, the start instant of the first watering coincides with the positioning instant and the indication of the selected program remains available to the user in the form of angular position of the switch, which with a dedicated indicator points at a program number the duration and frequency features of which can be read in a table located inside an opening cover overlapping the switch.

Such a control unit has the quality of being easily programmable also by a non expert user who only has to arrange the switch in the angular position corresponding to the desired program. On the other hand, it has the drawback that the start instant of the first watering coincides with the programming instant, whereby the physical presence of the user at that exact time is required, even at an inconvenient time. Secondly, it is not possible to know the time to the start of the next watering or to the end of the current watering cycle.

Moreover, the number of selectable programs is obviously limited to the number of possible angular positions of the rotary switch.

Electronic control units with two ways are also known, i.e. with one inlet and two outlets for the water, in which the outlets are controlled by respective electrovalves electronically controlled according to respective selectable programs.

A control unit according to the prior art is also disclosed in U.S. Pat. No. 5,602,728.

The object of the present invention is to provide a programmable electronic control unit with one or two ways which can have a high number of selectable programs, which is capable of starting the first watering immediately or at a delayed time with respect to the programming time without having to set a clock, and which is also capable of informing the user about the time to the start of the next cycle or the time to the end of the current cycle.

According to the present invention, such an object is achieved by means of an electronic control unit characterized in that it comprises a front panel including push-buttons for selecting a watering program, consisting of a first push-button for selecting a watering duration and of a second push-button for selecting a watering repetition frequency, at least one push-button for starting the selected program, and one display, characterized in that it further comprises an electronic micro controller which in response to the operation of said push-buttons for selecting a watering program controls the visualization of the duration and frequency of the selected program, and in response to the operation of the start push-button for a first number of times or for a first prefixed time controls the immediate start of the selected watering program and the visualization of the time to the end of watering, while in case of operation of the start push-button for a second number of times or for a second prefixed time arranges the delayed start of the selected program and the visualization of the time to the start of the watering program.

Through the combination of various durations and frequencies preset by the manufacturer and selected by the user by means of the first and second selection push-buttons, the electronic control unit according to the present invention thus allows the selection from a large number of programs (for example 98 programs, if the selectable durations are 14 and the selectable frequencies are 7), while maintaining a high simplicity of use.

Moreover, the delayed start of the selected watering program with respect to the program selection time is allowed, thereby allowing the user not to have to be present at the first program start time.

Finally, the constant knowledge of the time to the end of watering and, in case of delayed start, of the waiting time before the start itself is allowed.

A second push-button may be provided for the manual actuation of watering for a prefixed time.

The same above-described performance may be obtained in an electronic control unit with two water outlet ways controlled by respective electrovalves. Two push-buttons are provided in this case for starting the watering program which, in the step of selecting the program, allow the selected program to be associated with one or another of the two electrovalves and then allow the selected watering program to be started for either of the two electrovalves.

Two embodiments, one with one way and the other with two ways, will now be described by way of a non-limiting example with reference to the accompanying drawings, in which.

Figure 1:
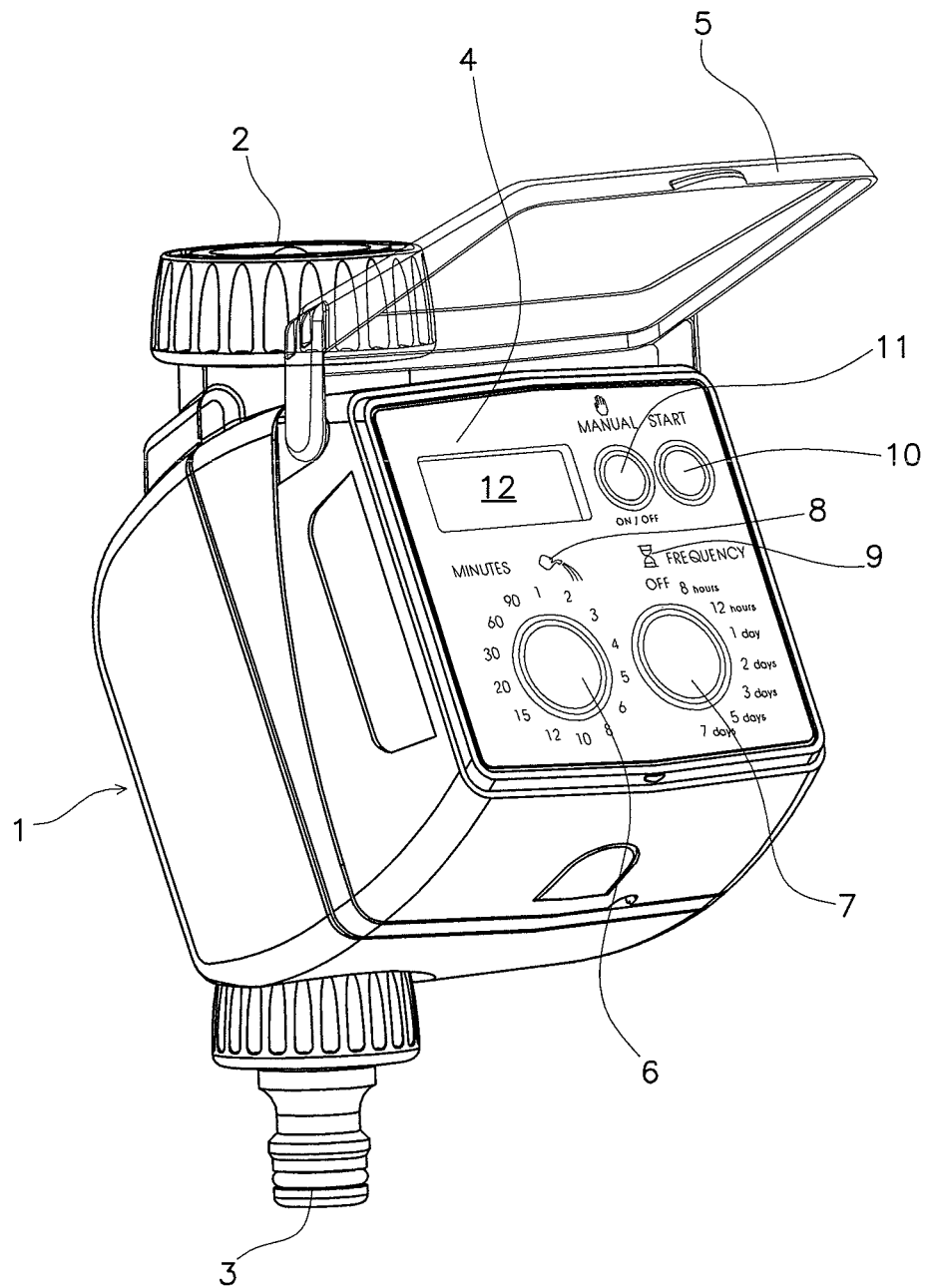
FIG. 1 shows a perspective view of an electronic control unit with one way according to the present invention.

The electronic control unit in FIG. 1 comprises a box-like body 1, within which an electrovalve (not shown) is accommodated, which opens and closes the water connection between an inlet 2 and an outlet 3. The electrovalve is electronically controlled by a micro controller, the functions of which will be explained hereinafter. One or more batteries contained inside the box-like body 1 provide the electric power needed for the operation of the internal electronic components of the control unit.

The box-like body 1 has a front panel 4 closable with a transparent cover 5 hinged to the top of the box-like body. The front panel 4 comprises two program selection push-buttons consisting of a first push-button 6 for selecting the watering duration from a plurality of durations preset by the manufacturer by means of the above micro controller, and of a second push-button 7 for selecting the watering repetition frequency from a plurality of frequencies preset by the manufacturer by means of the micro controller. Respective circumferential sequences of numbers indicative of the durations and frequencies are placed around the two selection push-buttons 6 and 7. An "OFF" writing indicative of a control unit turn-off condition is also provided around push-button 7. An irrigation symbol 8 is above push-button 6 and duration indications, and an hourglass symbol 9 is above push-button 7 and frequency indications.

Above the frequency selection push-button 7, the front panel 4 comprises two further push-buttons 10 and 11, the first one of which can be operated for actuating the program selected by means of push-buttons 6 and 7, while the second one can be operated for controlling the watering in manual mode. "START" and "MANUAL" writings are above the two push-buttons 10 and 11 for providing the user with the indications needed to operate the correct push-button.

An LCD display 12, preferably provided with backlighting, is placed next to the two start push-buttons 10 and 11 and above the selection push-button 6, which display is capable of visually representing a plurality of information about the control unit status, as will be explained in detail below with reference to FIG. 3.

Figure 2:
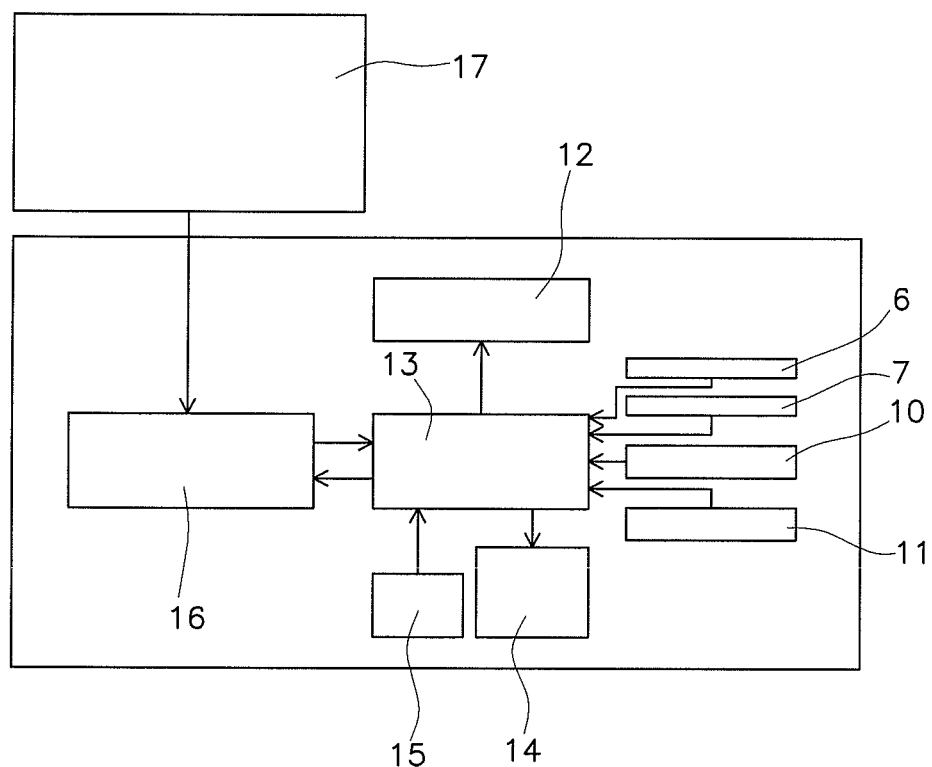
FIG. 2 shows the functional block diagram of the electronic control unit in FIG. 1.

FIG. 2 shows a block diagram of the inner electronic circuitry of the control unit. Reference numeral 13 indicates an electronic micro controller which controls the operation of the electrovalve (indicated with reference numeral 14) and of display 12. Micro controller 13 is electrically powered by means of one or more batteries 15 and is controlled by the push-buttons 6 and 7 for selecting the duration and frequency of the watering program and by the start push-buttons 10 and 11. The micro controller further communicates with an input/output port 16 which receives signals from an external device (generally indicated with reference numeral 17) which may be, for example, a wired rain sensor, a radiofrequency rain sensor (RF sensor) interface, a remote radiofrequency control device or other device.

Figure 3:
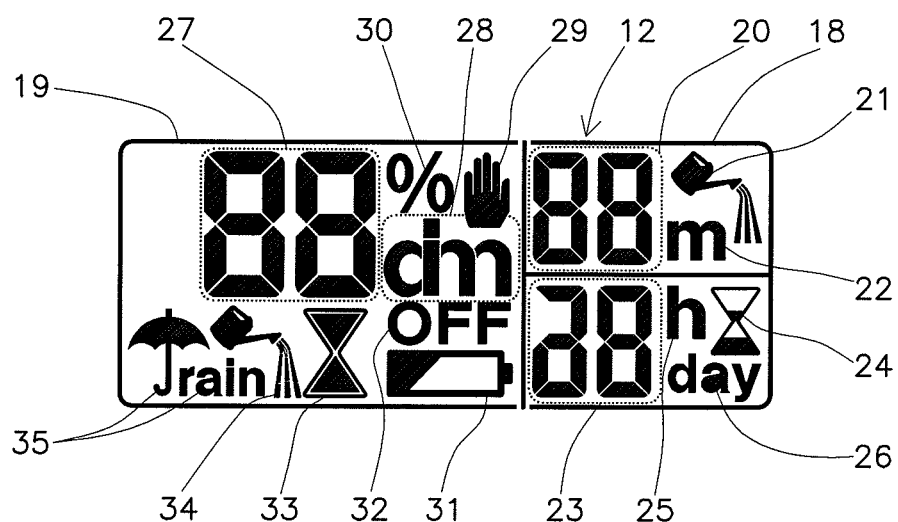
FIG. 3 shows possible examples of visual representations of the display of the electronic control unit in FIG. 1.

FIG. 3 shows an example of display 12, which is divided into two visualization areas 18 and 19. The visualization area 18 visualizes the information about the last selection made by means of the program selection push-buttons 6 and 7. The visualization area 19 visualizes the information about the residual times, meaning the time to the next irrigation or the time to the end of the current irrigation and other controls.

The visualization area 18 includes a numerical, dual-digit indicator 20 for displaying the duration of the watering in minutes, selected by means of push-button 6. A symbol 21 indicative of the irrigation duration and a symbol 22 indicative of the measure unit for the duration, more precisely minutes (m), are represented next to it. The visualization area 18 further includes a further numerical, dual-digit indicator 23 for displaying the waiting time between two automatic irrigations corresponding to the program selected by means of push-buttons 6 and 7 in hours or days (i.e. the programmed irrigation frequency). An hourglass symbol 24 indicative of a wait between two consecutive irrigations, a symbol 25 indicative of a measure unit for the waiting time, more precisely hours (h), and a symbol 26 indicative of another measure unit for the waiting time, more precisely days (day), are represented next to it.

The visualization area 19 includes in turn a numerical, dual-digit indicator 27 for displaying the remaining time—in days, hours, minutes and seconds—to the next actuation or the remaining time—in minutes or seconds—to the end of the current irrigation. There are further represented a modular symbol 28 for indicating minutes (m), hours (h) or days (d) of the time displayed in indicator 27, a hand-shaped symbol 29, indicative of a manual actuation, a budget symbol 30, a symbol 31 of battery down or to replace, a symbol 32 of control unit in OFF status, an hourglass symbol 33 indicative of wait between two programmed automatic irrigations, a symbol 34 of irrigation in progress consisting of two parts, i.e. the watering can body and the water coming out therefrom, and an umbrella symbol 35 indicative of rain with an adjacent RAIN writing.

The control unit in FIGS. 1-3 may be used as follows.

The selection of the watering program starts by assessing the possible duration and frequency combinations proposed by the manufacturer and indicated around push-buttons 6 and 7. Once the user has selected the most suitable program for his/her requirements, he/she presses push-button 6 and then push-button 7 the number of times needed to visualize the irrigation duration and frequency on display 12, by means of the numerical indicators 20 and 23 and symbols 22, 25 and 26.

Once the above-mentioned programming has ended, the user can start the watering cycle corresponding to the selected program by pressing the start push-button 10. If push-button 10 is pressed only once, symbols 27 and 28 of display 12 indicate "0 h" and after few seconds (for example 3), the watering cycle is started (with corresponding opening of the electrovalve interposed between inlet 2 and outlet 3) for the selected duration. If push-button 10 is pressed multiple times (for example 20 times), symbols 27 and 28 of the display indicate that the cycle will be started with a delay in hours equal to the number of times push-button 10 has been pressed minus 1 (for example 19). The first start time sets the repetition times of the watering cycle with the programmed frequency.

Once started, the numerical indicator 27 and symbol 28 indicate the waiting time to the end of the watering cycle, and the waiting time at the end of watering. After the first start, the watering cycle is periodically repeated with a period equal to the value displayed by 23 and by symbols 25 or 26. During the step of watering, the water can symbol 34 is lighted together with the symbol representing the water, the latter divided into three parts activated in a sequence to represent the water flowing.

If port 16 is wired or radiofrequency-connected to a rain sensor, the latter may intervene on micro controller 13 in order to cause the closing of the electrovalve. In this case, the umbrella symbol 35 with the flashing RAIN writing, appears on display 12. The watering can symbol 34 flashes too, but without the water output representation.

Watering in manual mode may be carried out between one automatic watering and another, or also interrupting the current watering. To this end, push-button 11 is pressed for three seconds, which on display 12 causes the visualization of the "hand" symbol 29, the visualization of the manual watering time, for example "5 m", by means of the numerical indicator 27 and the modular symbol 28, and the visualization of the "OFF" symbol 32, which indicates that the inner electrovalve of the control unit is closed. The manual watering is then started by pressing push-button 10, which causes the opening of the electrovalve. Display 12 continues to show the "hand" symbol 29, the numerical indicator 27 shows the manual watering time left and the watering can symbol 34 with the water coming out of the same, indicates that watering is in progress. The rain sensor status is ignored during manual mode operations. The electrovalve automatically closes, and accordingly the manual watering stops at the end of the prefixed time, or it may be ended in advance by pressing push-button 10. Push-button 11 must be pressed for three seconds with closed electrovalve or a timeout (for example, one minute) must be waited for in order to exit the manual mode.

Figure 4:
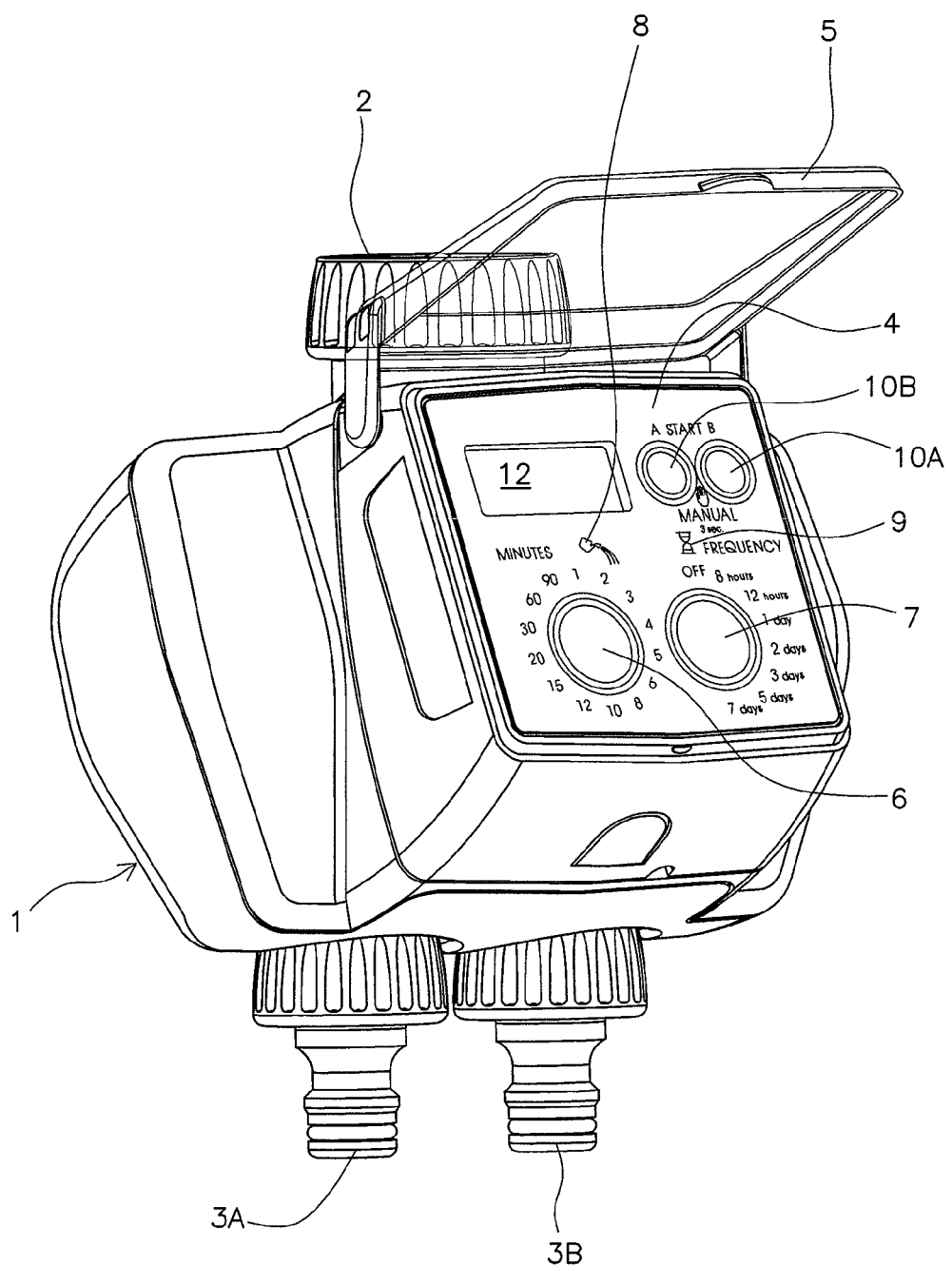
FIG. 4 shows a perspective view of an electronic control unit with two ways according to the present invention.
Figure 5:
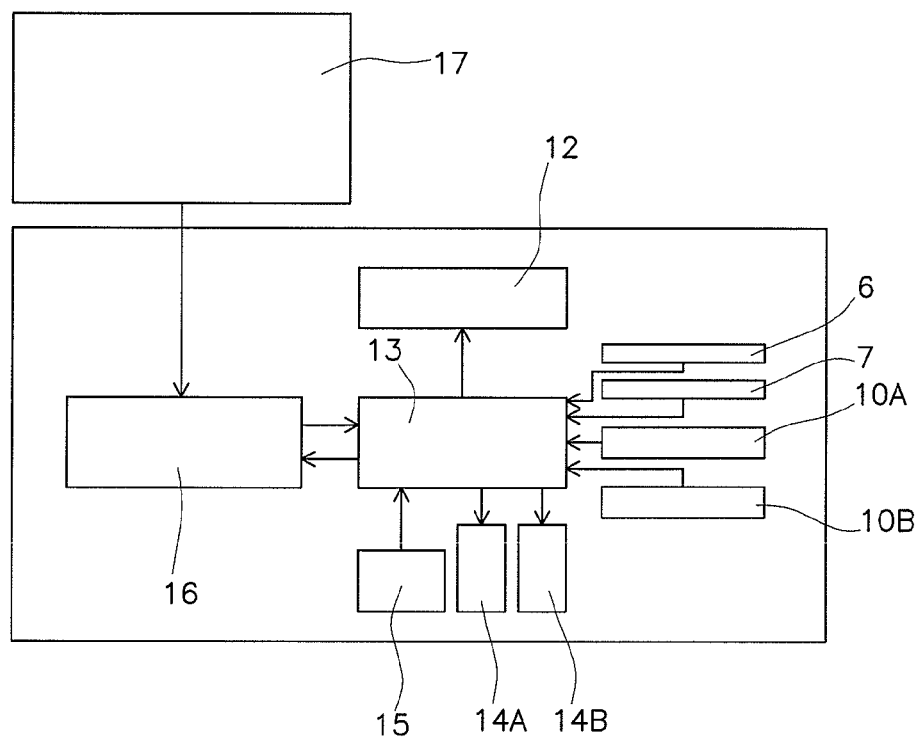
FIG. 5 shows the functional block diagram of the electronic control unit in FIG. 4.
Figure 6:
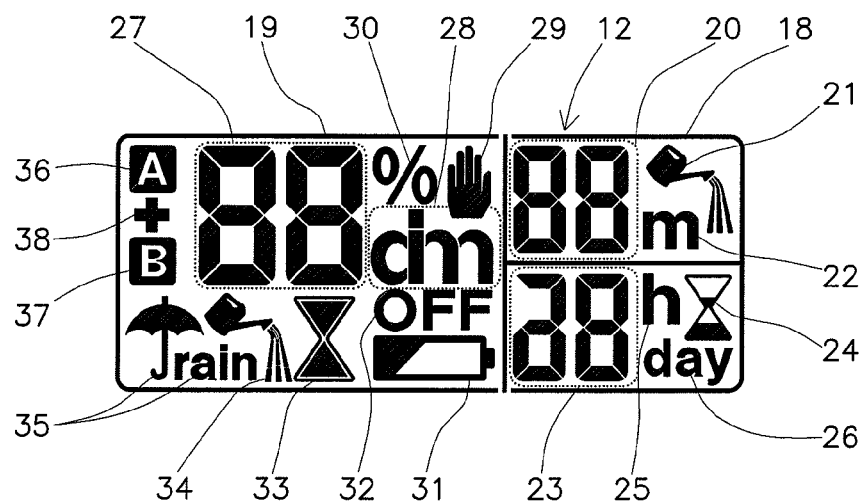
FIG. 6 shows possible examples of visual representations of the display of the electronic control unit in FIG. 4.

The control unit in FIGS. 4-6 is constructively and functionally similar to that in FIGS. 1-3. The essential difference is that it includes two water outlet ways, indicated as 3A and 3B (FIG. 4), and thus two electrovalves 14A and 14B, both controlled by micro controller 13 (FIG. 5) according to respective watering programs A and B independently selectable by means of push-buttons 6 and 7 and two push-buttons 10A and 10B which operate both as electrovalve selection push-buttons in the step of selecting the watering program, and as push-buttons for starting the programs selected for the electrovalves themselves. Display 12 (FIG. 6) differs from that of the previous control unit (FIG. 3) for the additional provision, in the visualization area 19, of symbols 36 (A) and 37 (B) which indicate that the visualization refers to electrovalve 14A or 14B, and of a symbol 38 (+) indicative of the simultaneous opening of both electrovalves.

The programming operation is similar to that described for the control unit in FIGS. 1-3 except in that, after pressing push-buttons 6 and 7 for selecting the watering program duration and frequency, it is necessary to press either of push-buttons 10A and 10B in order to associate the selected program with either of the two electrovalves 14A and 14B. In order to facilitate the user, both symbols A and B flash on display 12 prior to programming in order to indicate that a selection must be made.

Since there is the need to display both the times left of the program of electrovalve 14A and those of electrovalve 14B, the control unit automatically displays the shortest time left by turning on also symbol A or B to which it refers. In any case, the user always has the possibility of displaying the time left of the other program by pressing push-button 10 of the queried program (A or B): the control unit will automatically display the time left of the queried program for a few seconds (for example 3) to then return to the automatic visualization.

The control by means of the rain sensor is simultaneously applied to both programs, that of electrovalve 14A and that of electrovalve 14B, in the same way as described for the control unit in FIGS. 1-3.

Being able to independently program the watering cycles of the two electrovalves, it may happen that conditions in which both valves are simultaneously automatically opened are programmed in an intentional or accidental manner.

The factory setting of the control unit does not include the simultaneous opening of the two electrovalves as it is the most critical operating mode since, under conditions of not too high operating water pressures, the simultaneous opening of the two electrovalves may prevent the hydraulic system from correctly operating. Such a mode is called "shifting" since the control unit automatically triggers the opening of a valve while the other is already open, until the first valve closes. However, in case of sufficiently high pressure, the user can have the possibility of changing mode, thus allowing the automatic simultaneous opening of both electrovalves.

Therefore, the control unit in FIGS. 4-6 allows the mode to be changed from "Shifting" (non concurrence) of the opening of the two electrovalves, to "Overlapping" (concurrence) of the opening of the two electrovalves.

The operation of switching from one mode to the other may be carried out as follows:
press and hold the two push-buttons 10A and 6 simultaneously;
the condition of "push-button pressure not allowed" is shown for a few seconds since in normal operation, such a configuration of pressed push-buttons has no associated function; the average user, who may not fully understand the difference between the two modes, when a non allowed condition is displayed will interrupt the pressure, thereby causing no change between the two modes;
the currently operating mode is then visualized on the display for a few seconds, for example Shifting represented by symbols A and B which alternate on consecutive screens and by the watering can plus water symbol;
by releasing push-buttons 10A and 6 in this step, the current setting does not change;
after further seconds, the mode is inverted, in the exemplary case by switching from the Shifting mode to the Overlapping mode, in which the display shows symbols A+B, and again the watering can plus water;
by releasing the two push-buttons 10A and 6, the new mode is accepted and the control unit is reset while keeping the already programmed settings unchanged.

The manual function is carried out as follows.

The manual mode is entered by simultaneously pressing the two push-buttons 10A and 10B for few seconds. During these seconds, the flashing hand symbol 29 is visualized.

To manually open if closed, or close if open, electrovalve 14A for a time for few minutes, for example 3, preset at the factory, it is sufficient to press push-button 10A. The visualization is similar to that of the control unit in FIGS. 1-3 with the addition of the turning on of symbol "A".

To manually open if closed, or close if open, electrovalve 14B for the same minutes, preset at the factory, it is sufficient to press push-button 10B. The visualization is similar to that of the control unit in FIGS. 1-3 with the addition of the turning on of symbol "B".

Both valves may be opened manually.

The manual mode is exited by pressing again push-buttons 10A and 10B for a few seconds, for example 1, or after a prefixed timeout, only from the condition in which both valves are closed.

For all the 3 seconds, the "manual" symbol 29 flashes.

At the end, the condition that would have naturally occurred if the manual mode had not been entered is restored, with the exception that a condition of wait for the next watering is always switched to. In fact, all automatic openings of the valve are interrupted and disabled during the manual mode.

The invention claimed is:

1. An electronic control unit with one or two ways controlled by electrovalves for programmed watering of lawns, gardens, flower boxes and similar spaces, comprising a front panel, a display and an electronic micro controller, first and second watering program selection push-buttons for respectively selecting the watering duration and the repetition frequency of a watering program by moving indicators through circumferential sequences of numbers corresponding to respective duration and repetition frequency of water programs and a push-button for starting the selected program with the selected duration and repetition frequency, the electronic micro controller being controlled by said first and second selection push-buttons and connected to said display so that, in response to the operation of said first and second selection push-buttons, the micro controller causes the visualization of the duration and the frequency of the selected program, wherein said start push-button is associated to said micro controller so that, in response to a single operation of said start push-button, the micro controller causes the immediate start of the selected watering program and the advanced visualization of the start time, while in case of operation of the start push-button for a variable number of times or for a variable prefixed time the micro controller programs the delayed start of the selected program and the visualization of the delayer start time for the selected program.

2. The electronic control unit according to claim 1, wherein, in response to a single operation of said start push-button, the micro controller also controls the visualization of the time to the end of watering.

3. The electronic control unit according to claim 1, wherein said microcontroller also controls the visual representation of the waiting time from a watering operation and the next one.

4. The electronic control unit according to claim 1, comprising also a further push-button for actuation of a manual watering start mode for a prefixed time.

5. The electronic two-way control unit according to claim 1, comprising two start push-buttons used for association of the selected program to one or another of two electrovalves for control of the two ways and for the immediate or delayed start of said selected program.

6. The electronic two-way control unit according to claim 5, comprising a manual watering start mode which can be actuated by simultaneous operation of said start push-buttons.

7. The electronic control unit according to claim 5, comprising a mode of simultaneous actuation of the watering programs of the two electrovalves and a mode of non-simultaneous actuation a of the watering programs of the two electrovalves.

* * * * *